United States Patent
Subasic et al.

(10) Patent No.: US 9,750,061 B2
(45) Date of Patent: Aug. 29, 2017

(54) SYSTEM AND METHOD FOR WIRELESS MOBILITY PROTOCOL FOR HIGHLY DIRECTIONAL ANTENNAS WITH NETWORK TOPOLOGY AWARENESS

(71) Applicant: Redline Communications Inc., Markham (CA)

(72) Inventors: Bojan Subasic, Mississauga (CA); Ian McCallum, Palgrave (CA); Ryan Pacheco, Markham (CA); Yuriy Popov, Markham (CA); Eric Hacke, Toronto (CA); Bogdan Barna, North York (CA); Ioan Cojocariu, Vaughan (CA)

(73) Assignee: Redline Communications, Inc., Markham, Ontario (CA)

(*) Notice: Subject to any disclaimer, the term of this patent is extended or adjusted under 35 U.S.C. 154(b) by 0 days.

(21) Appl. No.: 15/264,694

(22) Filed: Sep. 14, 2016

(65) Prior Publication Data
US 2017/0006645 A1    Jan. 5, 2017

Related U.S. Application Data

(63) Continuation of application No. 14/516,915, filed on Oct. 17, 2014, now Pat. No. 9,468,028.

(51) Int. Cl.
| | | |
|---|---|---|
| *H04W 76/02* | (2009.01) | |
| *H04W 16/28* | (2009.01) | |
| *H04W 36/00* | (2009.01) | |
| *H04W 48/20* | (2009.01) | |
| *H04W 4/02* | (2009.01) | |
| *H04W 36/06* | (2009.01) | |

(52) U.S. Cl.
CPC ............ *H04W 76/02* (2013.01); *H04W 4/02* (2013.01); *H04W 16/28* (2013.01); *H04W 36/0055* (2013.01); *H04W 48/20* (2013.01); *H04W 36/06* (2013.01)

(58) Field of Classification Search
CPC ...... H04W 76/02; H04W 36/02; H04W 48/02
USPC ........................................................ 455/450
See application file for complete search history.

(56) References Cited

U.S. PATENT DOCUMENTS

| | | |
|---|---|---|
| 8,548,466 B1 | 10/2013 | Sarca |
| 8,706,109 B1 | 4/2014 | Sarca |
| 8,805,363 B2 | 8/2014 | Sarca |
| 8,886,237 B2 | 11/2014 | Sarca |
| 2002/0103013 A1 | 8/2002 | Watson |
| 2004/0053634 A1 | 3/2004 | Gainey |
| 2006/0105791 A1 | 5/2006 | Ginzburg |
| 2008/0220808 A1 | 9/2008 | Jalai |
| 2009/0042596 A1 | 2/2009 | Yavuz |

(Continued)

*Primary Examiner* — Michael Neff
(74) *Attorney, Agent, or Firm* — Rosenberg, Klein & Lee

(57) ABSTRACT

A system for communicating wireless signals between one or more sector controllers (SC) and one or more subscriber stations (SS) using different channels and different beams, wherein each of the one or more SS and the SC has a corresponding highly directional antenna; the one or more SC comprises a first SC; the one or more SS comprises a first SS; the first SS obtains network topology awareness (NTA) data from the first SC; the first SS selects a channel, a beam, and one of the one or more SC to establish an RF link based on the NTA data; and the first SS communicating with the selected SC using the established RF link.

15 Claims, 7 Drawing Sheets

(56) References Cited

U.S. PATENT DOCUMENTS

| | | |
|---|---|---|
| 2011/0075630 A1 | 3/2011 | Riess |
| 2011/0096739 A1 | 4/2011 | Heidari |
| 2012/0052828 A1 | 3/2012 | Kamel |
| 2012/0108284 A1 | 5/2012 | Patel |
| 2012/0250612 A1 | 10/2012 | Jalloul |
| 2013/0155847 A1* | 6/2013 | Li .................... H04W 24/04 370/225 |
| 2013/0295946 A1* | 11/2013 | Panchal ............ H04W 16/14 455/452.1 |
| 2014/0099700 A1 | 4/2014 | Shah |
| 2014/0099947 A1 | 4/2014 | Sarca |

* cited by examiner

TDD cycle for non-adaptive mode

SYSTEM AND METHOD FOR WIRELESS MOBILITY PROTOCOL FOR HIGHLY DIRECTIONAL ANTENNAS WITH NETWORK TOPOLOGY AWARENESS

CROSS REFERENCE TO RELATED APPLICATIONS

This application is a continuation of and claims priority to U.S. application Ser. No. 14/516,915, filed Oct. 17, 2014, now allowed, which is hereby incorporated by reference herein in its entirety.

FIELD OF THE INVENTION

The present disclosure relates to wireless networking technology.

BACKGROUND OF THE INVENTION

Although the invention will be described in connection with certain embodiments it is not limited to those particular embodiments. On the contrary, the invention is intended to cover all alternatives, modifications and equivalent arrangements as may be included within the spirit and scope of the invention as defined by the appended claims.

Many wireless systems today, for example, those used in WiMAX and Long Term Evolution (LTE), provide nomadic and mobile radio connectivity. These wireless standards are designed for use in cases where the base stations (BTS) are stationary or fixed and they may use directional and omnidirectional antennas. In these systems, subscriber stations (SS) or client devices are primarily designed for use with omnidirectional antennas.

In addition, these wireless protocols are designed primarily for use in licensed frequency bands of operation where high Effective Radiated Power (EIRP) levels are allowed so longer communication ranges are feasible even when low gain omnidirectional antennas are used. These types of wireless protocols do not offer any special treatment of client devices that may use directional antenna systems neither provide any special ways how to address mobility of such devices.

In today's wireless landscape there are many different frequency bands allocated by national agencies around the world which are allowed for unlicensed operation, but the allowed Effective Isotropic Radiated Power (EIRP) in those bands is significantly lower, typically around 36 dBm. These bands can offer, in many cases, excellent performance for a number of wireless applications that require nomadic and mobile modes of operation, but due to the reduced link communication range network performance suffers greatly and applications are limited.

For these systems, one way to overcome these problems is by utilizing highly directive antennas to improve link radio frequency (RF) system gain, hence leading to increased link communication range while allowing the system to stay within EIRP limits. A salient feature of the wireless communication systems that use highly directive antennas is better performance in interference congested environments, which are typical for unlicensed bands of operation. This is because using directive antennas which are pointed to the desired source of the RF signal, leads to reduction of crosstalk from undesired RF emissions belonging to other users sharing the same spectrum, which leads to better signal to noise ratios (SNR) and better RF link performance.

Long range communications using high directivity RF antennas require accurate positioning and adjustment of the antenna azimuth and elevation. In nomadic and mobile applications, use of highly directive fixed antennas is almost impossible, since this would require continuous trained operator involvement to readjust and tune antenna alignment whenever the position of the network nodes changes.

Any attempt to enable this functionality in large points to multipoint networks using current systems requires continuous end user intervention. This is time consuming and obviously not feasible. There is a need for a solution that allows usage of highly directive antennas by a large number of network nodes in an automated and reliable fashion. This system must be able to create and maintain wireless links while stationary or mobile in a fast and reliable way by changing or pointing antenna beams in the direction of desired RF network nodes.

While there are other products in the marketplace that implement automatic antenna pointing controller units and use a variety of the algorithms to optimize antenna position in order to maximize performance, these systems have drawbacks.

One drawback is lack of scalability, as these solutions are used in point-to-point systems. This makes it difficult for use in a point-to-multipoint system.

Another drawback is that these systems are often not part of an integrated radio design. Typically these solutions use external hardware controller units and software to control mostly motorized antenna positioners. The interaction of the radio unit used in the link and hardware controller is through separate physical link interfaces such as Serial Peripheral Interface (SPI), Universal Serial Bus (USB), or Ethernet connections. This is a drawback as it introduces added cost, more cabling and less reliable solutions in real deployments.

A further drawback is that these systems suffer from latency in making decisions for optimum antenna position. This is because the only possible way for these systems to interact with generic radio links is by constantly polling for status information from the radio in order to obtain needed radio statistics information, for example, received signal strength indicator (RSSI) readings.

Another drawback is that these systems suffer from loss of throughput due to the overhead of sending extensive messages required to perform continuous antenna alignment. Messages sent over the air are really sent form one external controller to another external controller hence they contain application layer overhead such as, for example, IP header, Ethernet headers and so on.

Furthermore, these systems require additional hardware which introduces significant cost. Another drawback is that additional hardware occupies more real estate on the antenna tower and mast systems, increases loading and requires more complicated deployment and installations.

BRIEF SUMMARY

A system for communicating wireless signals between one or more sector controllers (SC) and one or more subscriber stations (SS) using different channels and different beams, further wherein each of said one or more SS and said SC have a corresponding highly directional antenna; said one or more SC comprises a first SC; said one or more SS comprises a first SS; said first SS obtains network topology awareness (NTA) data from said first SC; said first SS selects a channel, a beam, and one of the one or more SC to establish an RF link based on said NTA data; said first SS communicating with said selected SC using said established RF link.

A method for communicating wireless signals between one or more sector controllers (SC) and one or more subscriber stations (SS) using different channels and different beams, further wherein each of said one or more SS and said SC have a corresponding highly directional antenna, and said one or more SC comprises a first SC; obtaining, by said first SS, NTA data from said first SC; and selecting, by said first SS, a channel, a beam, and one of the one or more SC, said first SS using said selected channel and beam to establish a second RF link to communicate with said selected SC; and said selecting based on said obtained NTA data.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
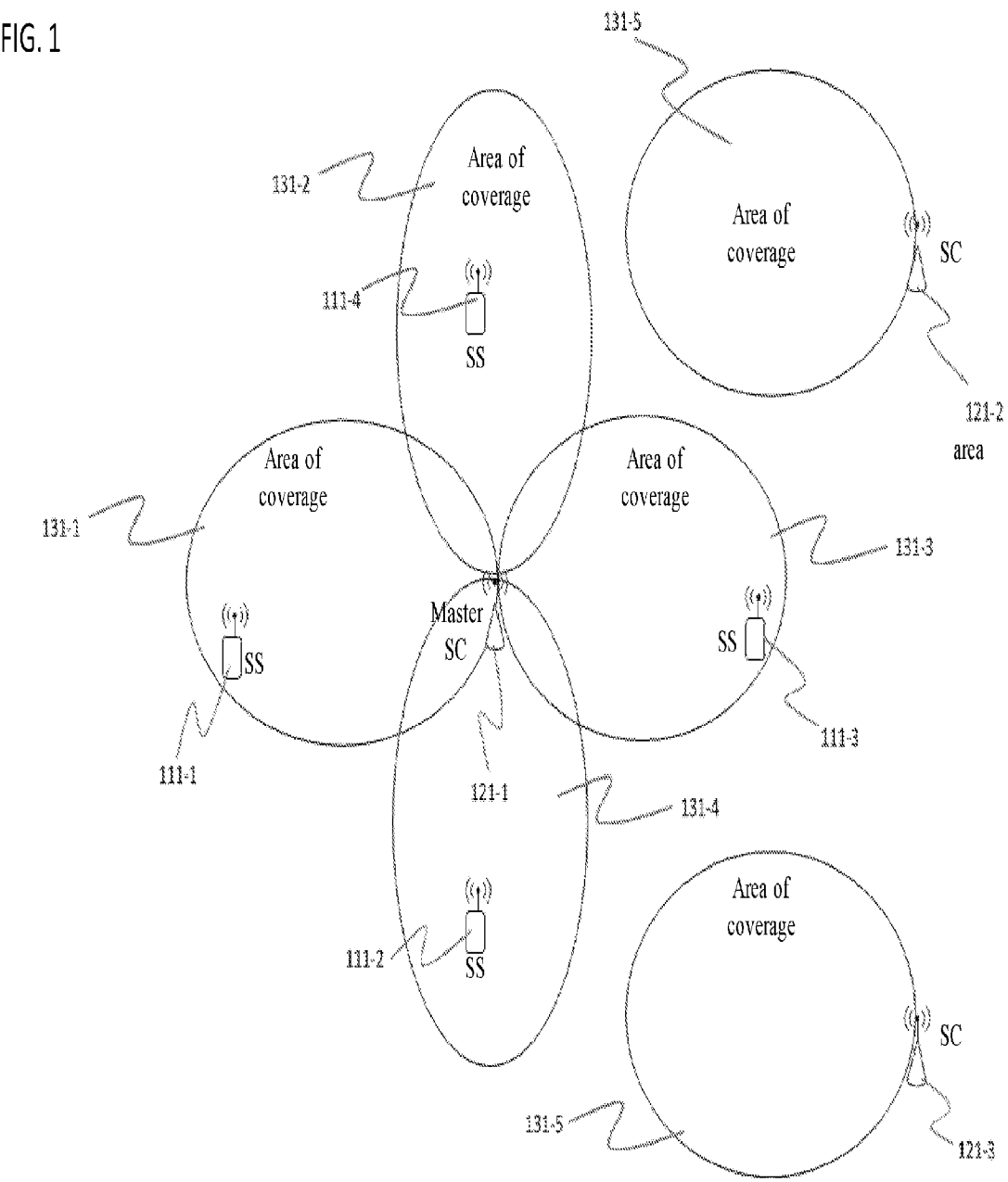
FIG. 1 shows a typical mobile/nomadic wireless network deployment with multiple base stations each consisting of one or multiple sector controllers with one or multiple directional antennas.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

The Wireless Mobility Protocol for Highly Directional Antennas with Network Topology Awareness (WMPHDA-NTA) protocol aims to provide such a solution. The WMPHDA-NTA protocol allows optimum exchange of downlink and uplink control plane messages, thereby minimizing communication overhead so and limiting impact on data plane throughput. In one embodiment, it is implemented in the Media Access Control (MAC) layer.

The WMPHDA-NTA protocol supports Sector Controller (SC) and Subscriber Station (SS) in a typical hub and spoke configuration. The WMPHDA-NTA protocol is applicable to number of use case scenarios.

In one embodiment, the WMPHDA-NTA protocol is for use with fixed/stationary sector controllers (SC) and fixed, nomadic and roaming/mobile SS.

The term nomadic mode refers to a mode where SC or SS are mostly stationary but from time to time they are moved to different locations. Connectivity during movement is not required, but when the SC or SS arrives at a new location, connectivity is restored without user intervention. Roaming/mobile mode refers to a mode where either the SC or SS are moving, and connectivity during movement is required.

In another embodiment, the WMPHDA-NTA protocol is for use with nomadic SC and fixed, nomadic and roaming/mobile SS.

In another embodiment, it is for use with mobile SC and fixed, nomadic and roaming/mobile SS.

In one embodiment, the WMPHDA-NTA protocol is used in point-to-point systems.

In another embodiment, the WMPHDA-NTA protocol is a scheduled point to multipoint wireless protocol and comprises one master SC and one or more slave SSs.

An example embodiment is shown in FIG. 1. Three SCs are shown (121-1, 121-2 and 121-3) with various areas of coverage. Areas 131-1 to 131-4 belong to SC 121-1. Area 131-5 belongs to SC 121-2. Area 131-6 belongs to SC 121-3. SC 121-1 communicates with SS 111-1 to 111-4 since these are within its areas of coverage. For this particular case, communications take place between master SC 121-1 and any of the slave SSs. In one embodiment, there is no direct communication between any two slaves but two slaves can exchange data via the master. A transmission performed by the SC 121 is called a downlink (DL) and a transmission performed by an SS such as 111-1 to 111-4 is defined as an uplink (UL). While in this embodiment the WMPHDA-NTA protocol is based on traditional spoke and hub configuration, it is extensible to different configurations as well.

As explained previously, the WMPHDA-NTA protocol supports different types of SC and SS units, including fixed and roaming/mobile units. Fixed SS units in most cases are equipped with highly directional antennas that are aligned for optimum link performance during installation with SC antenna. Roaming/mobile SS units can use a variety of antenna solutions. Example solutions include omnidirectional antennas, electrically steering phase array antennas or highly directive antennas mounted on motorized positioner units.

The WMPHDA-NTA protocol is not limited to one specific frequency band of deployment, or a specific type of directive antenna used or the method of antenna control. Antennas may be electrically steerable, for example, phased array antennas; or mechanically steerable where antennas are installed on motorized positioner units.

In one embodiment, the WMPHDA-NTA protocol supports various channel bandwidths, such as 20, 10, 5, 2.5, 1.25, 14, 7, 3.5, 1.75 and 0.875 MHz. The channel bandwidths are not limited to this range.

In one embodiment, the WMPHDA-NTA protocol supports Orthogonal Frequency Division Multiplexing (OFDM) operation. In another embodiment, the WMPHDA-NTA protocol supports OFDMA (Orthogonal Frequency Division Multiple Access) multiplexing scheme.

The WMPHDA-NTA protocol can be used in a variety of duplexing arrangements, including time division duplexing (TDD), frequency division duplexing (FDD) and half frequency division duplexing (HFDD) access.

In one embodiment WMPHDA-NTA supports multiple Modulation Coding Schemes (MCS) and Forward Error Coding (FEC) rates for transmission and reception of end user data. Examples of supported MCS are BPS, QPSK, 16 QAM, 64 QAM and 256 QAM. Examples of supported FEC rates are ½, ⅔, ¾, ⅚ and ⅞.

In one embodiment WMPHDA-NTA supports a Multiple Input Multiple Output (MIMO) mode of operation. In one embodiment, this is primarily MIMO-A space time coding (STC) for increased link robustness and range. In another embodiment, this is MIMO-B spatial multiplexing (SM) for increased link capacity.

In one embodiment the WMPHDA-NTA protocol supports adaptive modulation control (AMC). The SC MAC layer continuously adapts and controls which MCS, FEC rate and MIMO mode shall be used during and per link operation based on actual link statistics RSSI, SNR and packet error rate hence maximizing and adjusting throughput performance of the link dynamically in accordance with RF channel state and quality.

In one embodiment the current MCS chosen by WMPHDA-NTA SC is treated as a de facto link quality indicator (LQI) and hence can be used as a trigger to perform SS initiated link hand over from one SC to another SC in the network.

SC Description

The SC is a central hub in the wireless network. All traffic in the DL direction (SC to SS) as well in UL direction (SS to SC) flows through it. The WMPHDA-NTA is a scheduled protocol. In one embodiment, the WMPHDA-NTA is a MAC level protocol. As explained previously, the SC may be fixed, nomadic or roaming/mobile.

Figure 2A:
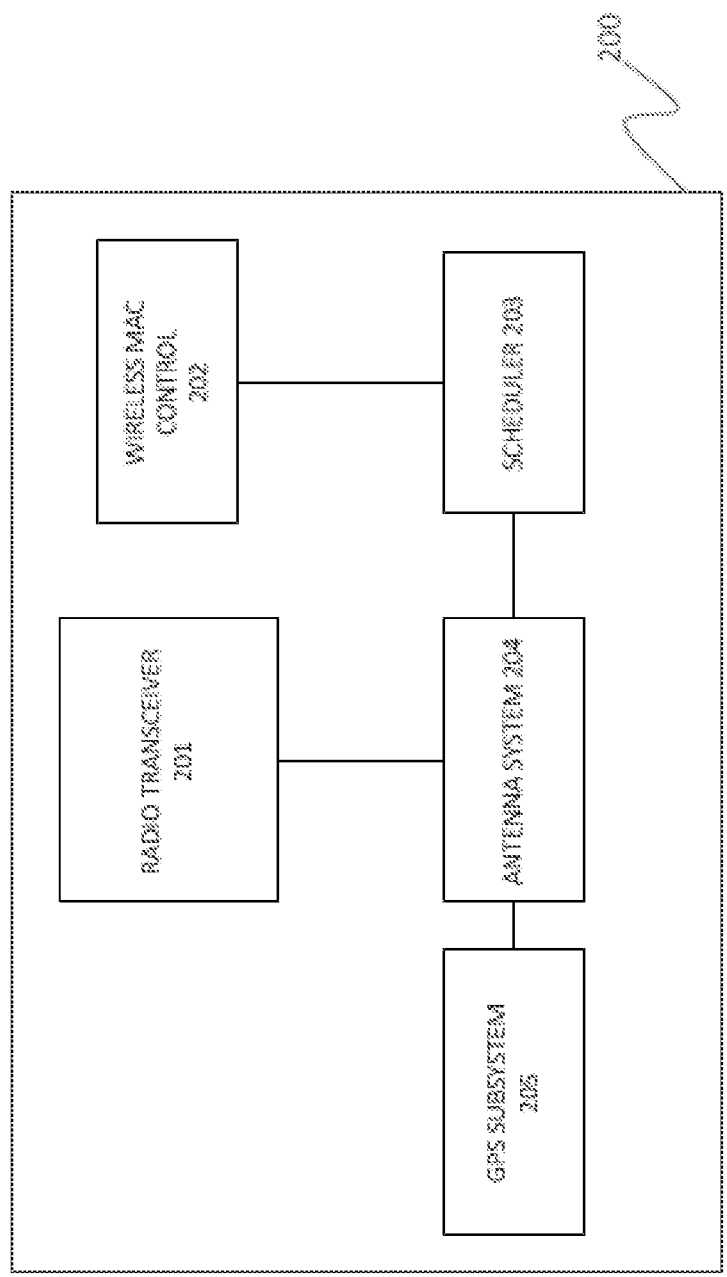
FIG. 2A shows one embodiment of an SC (sector controller).

In one embodiment, as shown in FIG. 2A the SC 200 contains a radio subsystem 201, wireless MAC control 202, scheduler 203, antenna system 204 and Global Positioning Satellite (GPS) subsystem 205. In another embodiment, the SC 200 is mobile, with a highly directive antenna and an antenna control system within antenna system 204. In another embodiment, GPS subsystem 205 is a GPS real time kinematic (RTK) subsystem.

The SC 200 can be implemented in a variety of fashions. In one embodiment, all of components 201-205 are interconnected via, for example various interconnection techniques known to those of skill in the art. In one embodiment, SC 200 is implemented using one or more servers. In one embodiment, SC 200 is implemented in software. In another embodiment, SC 200 is implemented in hardware. In one embodiment, SC 200 is implemented using software and hardware.

In one embodiment, the WMPHDA-NTA is implemented using at least one of the wireless MAC control 202 and scheduler 203.

The one or more antennas within antenna system 204 can be implemented in a variety of ways. In one embodiment, the one or more antennas are electrically steerable, for example, phased array antennas. In another embodiment, the one or more antennas are on mechanically steerable where antennas are installed on motorized positioner units.

In one embodiment, the SCs in a large point-to-multipoint deployment are configured to operate on a different frequency channel according to a radio frequency (RF) plan. All SCs belonging to the same wireless network are initialized with Network Topology Awareness (NTA) data. In one embodiment, NTA data is imported into the SC. Importing of NTA data into SC is done through various mechanisms. In one embodiment, importing of NTA data is done via command line interface (CLI). In another embodiment, the importing of NTA data is performed a web interface. In yet another embodiment, importing of NTA data is done remotely using Simple Network Management Protocol (SNMP). The NTA data is stored in, for example, scheduler 203 or wireless MAC control 202.

In one embodiment, the NTA data set is transmitted from the SC to the SSs by, for example, wireless MAC control 202 and scheduler 203 using the DL control channel. This is performed during, for example, SS initialization or updates. In one embodiment, the NTA data set contains a list of sector controller identification (SCID) corresponding to each SC in the geographic area, a list of frequency channels used by each SC, center frequency of operation for each channel, the channel bandwidth, 3D GPS location data for each SC, RF antenna azimuth bandwidth for each SC, RF antenna azimuthal beam width (for example 60, 90, 120, 360 degrees) for each SC and RF antenna bearing for each SC. In one embodiment, the network topology information varies depending on whether SCs and SSs are fixed or mobile. In one embodiment, the NTA information changes dynamically, such as in the case where some or all SCs are roaming/mobile.

In a further embodiment, the SC continually "pushes" NTA data to the SSes, that is, the data is transmitted without the SSes requesting the data. In another embodiment, the SSes "pull" data from the SC, that is, the SC transmits NTA data only when the SSes submit a download request for the data. In yet another embodiment, both pushing and pulling is performed, that is the SC continually transmits data to the SSes, but will also respond to requests for data downloads from the SSes. In a further embodiment, if the SC is roaming/mobile, the SC transmits data to the SSes when its position changes. In yet another embodiment, in the case of a mobile SS the updating is triggered whenever the SS crosses a geo-fence, that is, if the SS travels a certain distance away from its current point.

As explained previously, in one embodiment, the WMPHDA-NTA protocol relies on DL and UL control plane message exchange to communicate internal radio status and statistics information. The WMPHDA-NTA protocol allows optimum exchange of DL and UL control plane messages limiting impact on throughput. As explained previously, in one embodiment the WMPHDA-NTA protocol is implemented in the wireless MAC layer by the wireless MAC control 202, thereby eliminating the need for external hardware controllers hence reducing cost and size of the system.

In one embodiment, the WMPHDA-NTA protocol implements an automatic ranging procedure without the need for dedicated periodic ranging slots like WiMAX or LTE, thus eliminating constant overhead and loss of throughput associated with this approach. Further information on how this is performed is given below.

SS Description

Figure 2B:
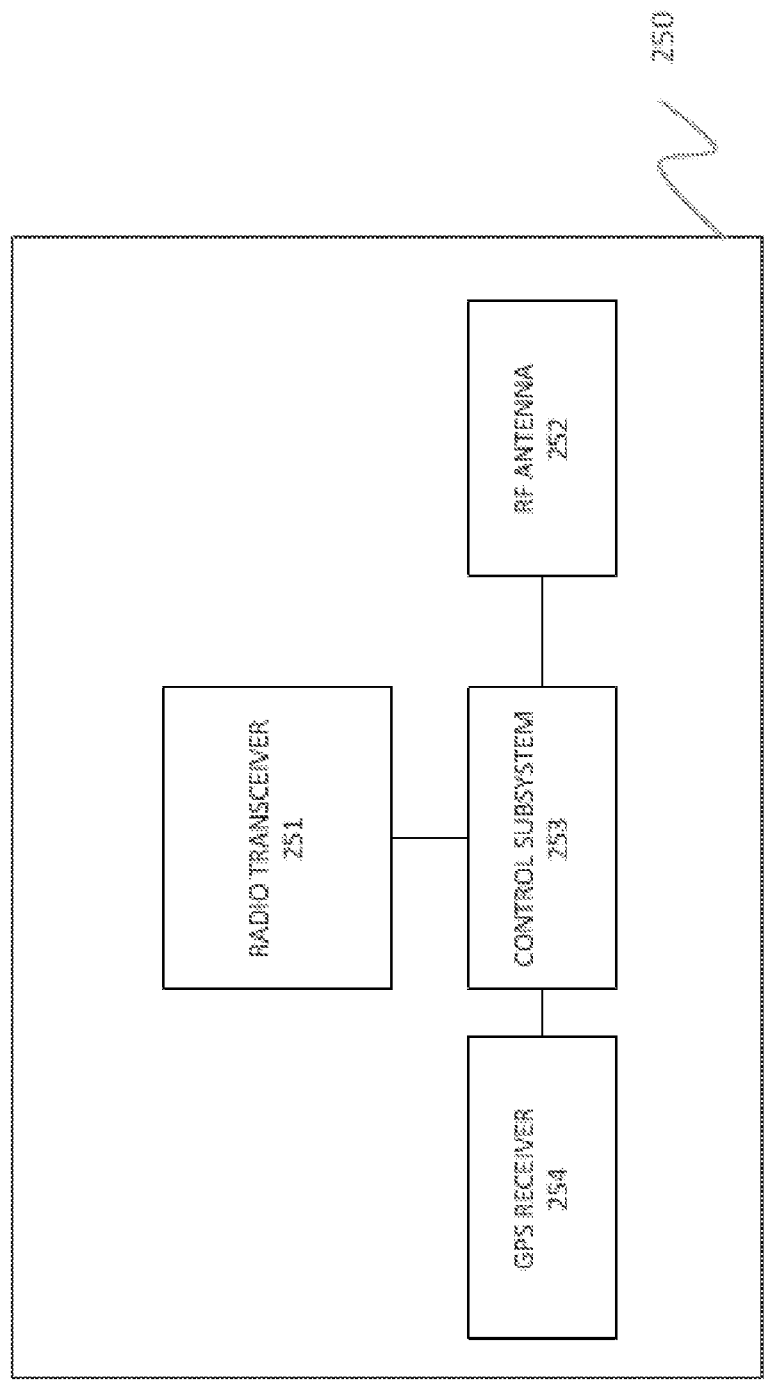
FIG. 2B shows one embodiment of an SS (subscriber station).

An embodiment of an SS 250 is shown in FIG. 2B. In one embodiment, SS 250 comprises a radio transceiver 251, antenna subsystem 252, control subsystem 253 and GPS subsystem 254. The SS 250 can operate in fixed, nomadic or roaming/mobile modes.

Information can be passed between the radio transceiver 251, antenna subsystem 252, control subsystem 253 and GPS subsystem 254. For example, the control subsystem 253 can receive information, including, but not limited to LQI; and other information such as SC operating capacity and SC load/utilization; from either or both of the radio transceiver 251 and the antenna subsystem 252. The control subsystem 253 can process this information and commands either or both of the radio transceiver 251 and antenna subsystem 252 accordingly.

The radio transceiver 251 performs several different functions, including but not limited to, for example, transmitting UL information and receiving DL information on the available operating channels; obtaining data to compute signal quality measures such as signal to noise ratio (SNR) and signal to interference and noise ratio (SINR); and computing these measures either by itself or together with the control subsystem 253. In one embodiment, the operating channel to be used for transmitting and receiving is set by the control subsystem 253. The radio transceiver 251 can transmit on more than one frequency channel. In a further embodiment, the radio transceiver 251 receives NTA data from an SC such as SC 200. In a further embodiment, radio transceiver 251 performs processing of NTA data received from the SC.

In one embodiment, the antenna subsystem 252 provides multiple beams for selection by the control subsystem 253. The multiple beams are produced by one or more independent antennas, using beam-steering or by beam-forming. As explained previously, these one or more antennas can be implemented electrically or mechanically. These techniques are well known to one having skill in the art. In a further embodiment, antenna subsystem 252 implements an antenna/positioner driver layer. In a further embodiment, the antenna/positioner driver layer is implemented using both the antenna subsystem 252 and control subsystem 253.

The control subsystem 253 commands, controls, co-ordinates and manages the operation of the antenna subsystem 252, radio transceiver 251 and GPS subsystem 254. As explained previously, the control subsystem 253 can receive information, such as wireless link status from either or both of the radio transceiver 251 and the antenna subsystem 252. When link status is active, the control subsystem 253 can collect information related to, for example, signal quality; and other information such as base station operating capacity and base station load/utilization; from the radio transceiver 251, or both the radio transceiver 251 and antenna subsystem 252. The control subsystem 253 can process this collected information and send commands and control instructions to either or both of the radio transceiver 251 and antenna subsystem 252 accordingly.

In a further embodiment, control subsystem 253 controls DL and UL transmission from and to an SC. In a further embodiment, the control subsystem 253 comprises wireless MAC control. In a further embodiment, the wireless MAC control combined with antenna/positioner driver layer handles the management of the antenna bearing during normal operation in accordance to configuration of the radio unit.

In a further embodiment, the GPS subsystem 254 collects GPS information. In one embodiment, if SS 250 is roaming/mobile, GPS subsystem 254 are GPS RTK receivers, hence 3D GPS position and heading data are continuously available. Then, the wireless MAC control in, for example, control subsystem 253, continuously calculates antenna position vector based on the NTA data set and internal GPS data. It then uses this information, for example, in conjunction with antenna subsystem 252 so as to maintain best possible connectivity with an SC.

Figure 3A:
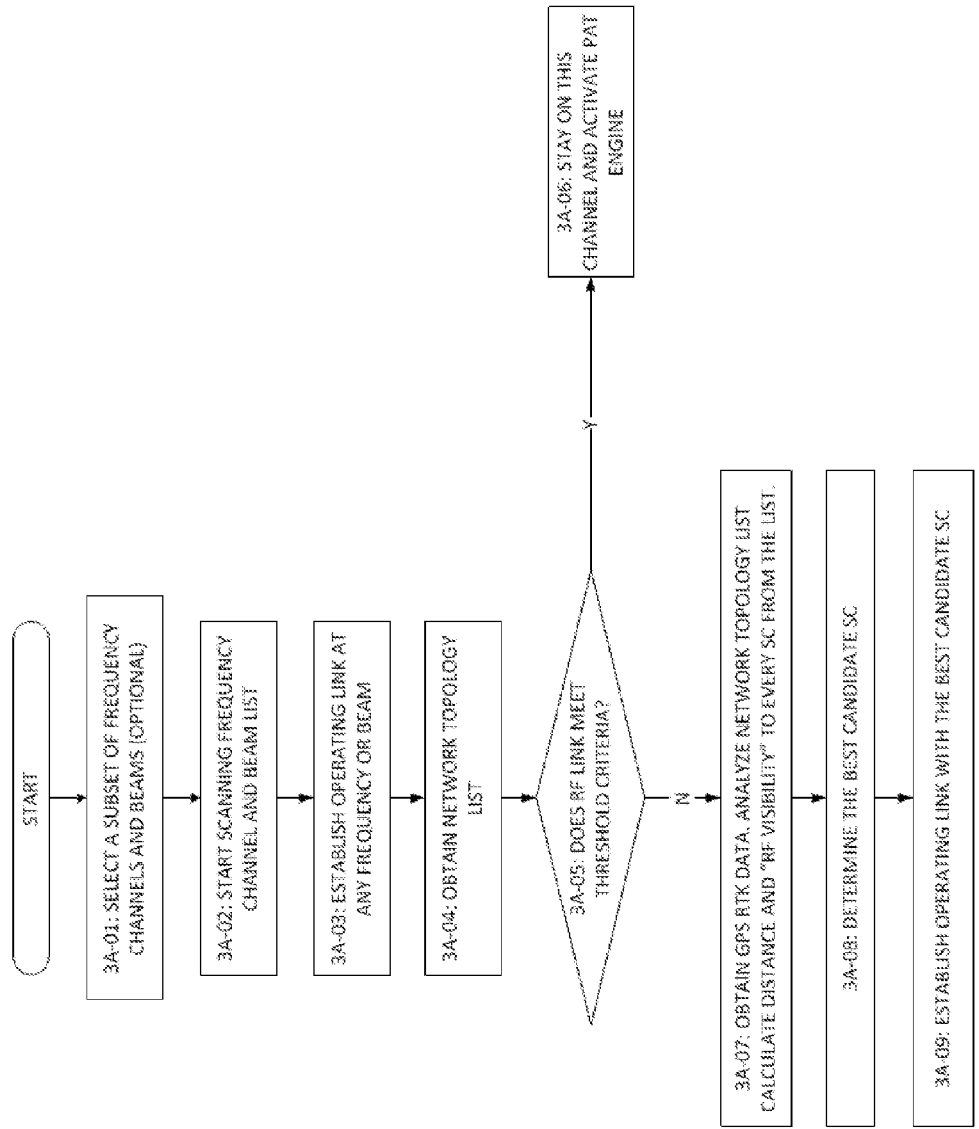
FIG. 3A shows one embodiment of SS network registration and attachment.

An SS such as SS 250 connecting to the network for the first time performs network registration. In one embodiment, an SS connecting to a wireless network for the first time performs a general space and frequency auto scan. The space and frequency scan is part of the network initialization procedure under the control of the MAC layer. Depending on the antenna types, for example whether the antennas are motorized or beam steering, the MAC layer uses an appropriate driver, controls the antenna direction and keeps scanning all frequency channels in the frequency scan list. Then, the SS chooses an SC to attach to and obtains network topology information through the DL control channel. An embodiment is shown in FIG. 3A.

In one embodiment, the SS scans all frequency channels and beams. In optional step 3A-01, a subset of frequency channels and beams are selected. In step 3A-02, either all frequency channels and beams are scanned, or the subset selected in step 3A-01 is scanned. In one embodiment, an SS is configured during provisioning with a frequency range list. In one embodiment, the SS does not have any knowledge of the center frequency of operation of the corresponding SC. In this case, at startup and before link establishment, the SS performs frequency and space auto scanning using this frequency range list to determine which SC initially to connect to.

In one embodiment, in step 3A-03, upon detection of an SC on a particular frequency channel and antenna beam bearing, the SS initiates the registration procedure to establish the operating link.

Figure 3B:
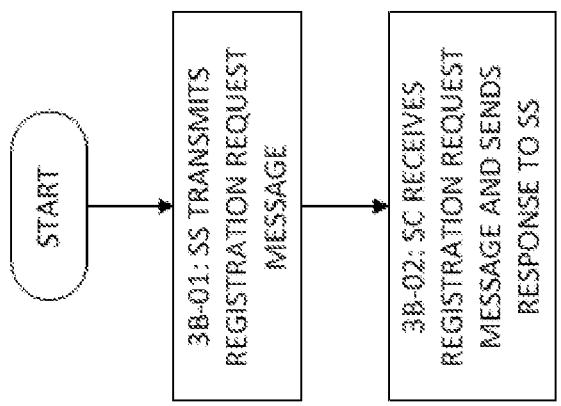
FIG. 3B shows an embodiment of registration procedure.

FIG. 3B shows a particular embodiment of the registration procedure. In one embodiment, in step 3B-01 the SS transmits a registration request message to the SC. In a specific embodiment, a registration request is transmitted in a registration burst portion of a wireless frame as will be explained later. In a specific embodiment, the SS is configured as a roaming/mobile unit in the message header information. This indicates to the SC that this is a request from a roaming/mobile SS.

In one embodiment, in step 3B-02, upon reception of the registration request message, the SC processes the message and responds to the SS. In one embodiment, the message comprises a Link Configuration Data set that contains Link ID, Service Flow ID's, maximum PIR (peak information rate), CIR (committed information rate). In one embodiment, all subsequent traffic between the SC and the SS is scheduled and addressed using this ID structure. In one embodiment, the SS receives the response and acknowledges reception of this response with another message. With this, a data RF link is established between the SC and the SS.

Returning to FIG. 3A, in step 3A-04, the SS then obtains an NTA data set through an UL/DL message exchange. In one embodiment, a network topology list is obtained from the SC as part of the NTA data. In one embodiment, the SC then transmits a control message that contains NTA data. This approach avoids sending unnecessary data to fixed SS, and hence saves the system bandwidth for payload. At this point, the SS is fully aware of the network topology. For example, the SS is fully aware of the location of all SC in the area, their antenna characteristic beam widths and bearings are now known. The SS, based on its own GPS RTK data and the network topology data, can calculate RF visibility and distance between every SC from the NTA list and its own antenna thereby creating a best candidate list.

In step 3A-05, a determination is made about whether the established RF link meets certain threshold criteria. In one embodiment, an SS is configured with minimum required RF link threshold criteria, minimum MCS (modulation coding scheme) required for link to operate at.

If the RF link meets the threshold criteria, then in step 3A-06, the SS stays on the established frequency channel and beam with the current SC. Then, antenna subsystem 252 in conjunction with control subsystem 253 performs positioning, acquiring and tracking (PAT). Different types of PAT algorithms are possible. In various embodiments, PAT algorithms use conical, linear or any other sweeping antenna tracking movement in order to optimize RSSI, SNR and PER statistics of the radio link. In one embodiment, the PAT algorithm is independently controlled and selected depending on the antenna type and physical characteristics of the antenna azimuth and elevation beam width. In one embodiment, the network topology information in combination with subscriber RF link statistic Information such as RSSI, SNR and PER available on a frame by frame basis to the SS wireless MAC layer, internal GPS data position and heading if available, allows the radio to continuously perform antenna PAT.

If no, in step 3A-07 the SS obtains GPS data from the GPS subsystem 254. In one embodiment, in step 3A-07, the SS analyzes the network topology list communicated as part of the NTA data. It calculates distance and RF visibility to every SC from the list. In step 408, the best frequency channel, beam and candidate SC is determined.

In step 3A-09, an operating link with the best SC is established, using the best frequency channel and beam, using a similar process to that outlined in step 3A-03.

In one embodiment, an SS is configured during provisioning with mode of operation set to fixed or roaming/mobile, antenna type, that is, electrically steering or motorized, and antenna beam-width characteristics.

Since the WMPHDA-NTA is implemented in the MAC layer, in an embodiment, if the PAT algorithm is implemented in the MAC layer, the algorithm is capable of taking GPS co-ordinates from GPS subsystem 254 and enhance antenna pointing and tracking solution, by continuously calculating a pointing vector based on network topology information obtained from the NTA data set, and position of the SS unit as calculated using GPS subsystem 254.

In one embodiment, GPS subsystem 254 obtains heading information of the SS for the MAC layer PAT algorithm to use. Heading information may be obtained through variety of the sensors and sources.

In one embodiment, the control subsystem 253 calculates heading information using successive positions obtained from GPS subsystem 254. This is also known as a soft GPS heading solution. Such a solution is valid if vehicle moves at speeds greater than a minimum threshold.

In another embodiment, GPS subsystem 254 is a GPS RTK solution, which is capable of providing and measuring heading at stationary or slow moving speed.

In another embodiment, SS 250 may be equipped with magnetometer or any other non-GPS based heading information sensor.

In another embodiment, heading information is passed through a dedicated software application programming interface (API) to the MAC layer from an external source such as, for example, a ship navigation system.

In another embodiment, the PAT algorithm is highly adaptable and flexible to mounting antenna itself on the tracking device and installation of tracking device on vehicle/vessel itself.

Figure 4:
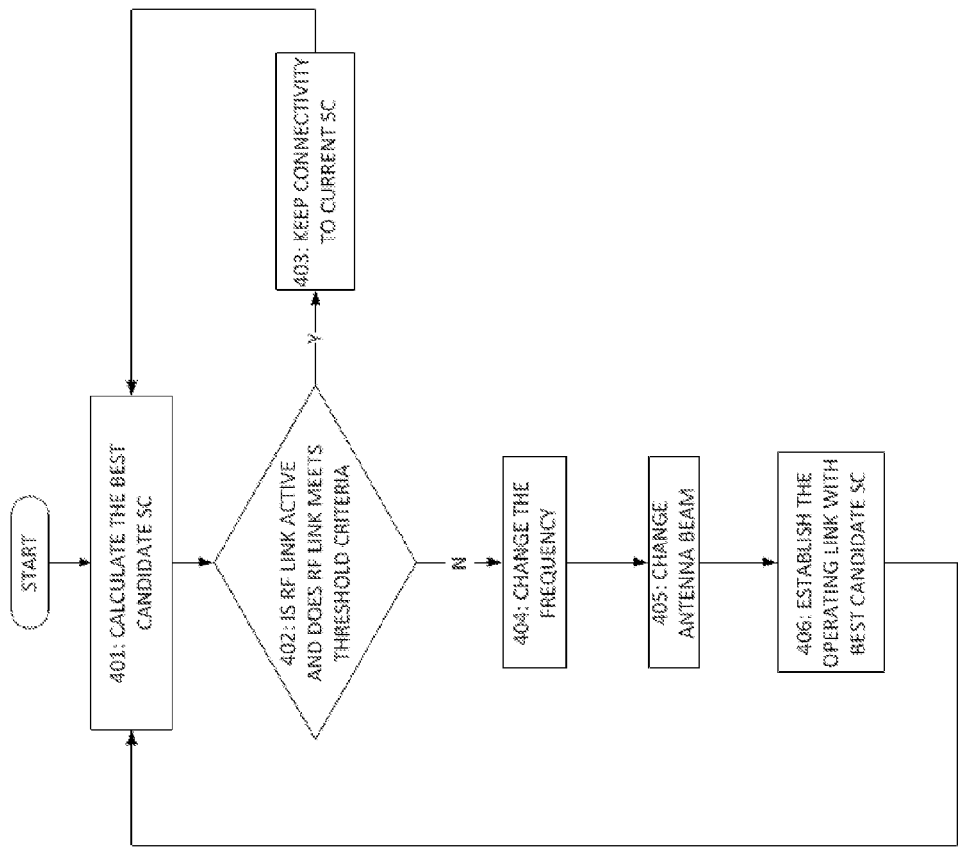
FIG. 4 shows one embodiment of SS handover.

As is known to one of skill in the art, occasionally the need will arise for transition or handover of communication link from one SC to another SC. One embodiment of an SS-initiated handover process is shown in FIG. 4.

In step 401, the SS calculates the best candidate SC. In one embodiment, this calculation is based on GPS RTK data and the available NTA data set. In one embodiment, the SS first updates its NTA data set by, for example, downloading a NTA data set from the currently connected SC. In one embodiment, in the case of a mobile SS the updating is triggered whenever the SS crosses a geo-fence, that is, if the SS travels a certain distance away from its current point. In one embodiment, SS handover is performed based on NTA information and internal GPS location. An SS executing a PAT algorithm continuously calculates proximity and visibility of SCs from NTA information, using its own GPS co-ordinates if available, and heading information if available. This is so that the SS can pre-emptively decide to switch the frequency and correct antenna pointing vector to connect to the closest RF visible SC.

In one embodiment, in step 402 the SS determines whether the current RF link is active and whether it meets certain threshold criteria. SS handover can be triggered by different trigger events. In one embodiment, loss of communication link with existing SC or MCS (effectively LQI threshold) is used to trigger the handover process. In one embodiment, this is performed by determining whether the current MCS is better than the threshold MCS. In one embodiment, WMPHDA-NTA protocol implementation allows MCS threshold selection on the SS. In the event when MCS drops below desired threshold SS shall initiate handover procedure. In another embodiment, oversubscription ratio or loading factor of the SC is used as a trigger. In an additional embodiment, an SS can initiate pre-emptive handover procedure if the next best candidate can provide significantly higher MCS (modulation coding scheme). For example, based on the distance to different candidate SCs, MCS are estimated for each SC. If higher than current MCS with serving SC could be established handover would be initiated.

If yes, then in step 403 the SS stays connected to the current SC. If not, then the SS changes to connect to the best candidate SC. In one embodiment, the SS, based on NTA data set and current GPS coordinates, sorts a list of SC in the area based on RF visibility and distance. Then, the SS will select best candidate from the list based on the distance and RF visibility. Having NTA data, the MAC layer is able to change frequency of the radio to match the frequency channel of the best candidate SC, calculate the new antenna position vector, and executes beam steering action In one embodiment, to achieve this, in step 404 the frequency channel is changed to the best candidate frequency channel so as to connect to the best candidate SC.

Then, in step 405, the beam is changed to the best available beam so as to connect to the best candidate SC as explained previously.

In step 406, the operating link using the best frequency channel and beam is established with the new SC. In one embodiment, the SS continues to calculate performance.

The approach outlined in FIG. 4 minimizes significantly amount of time required to perform SS handover and makes handover process smooth.

In an embodiment, an SC initiated handover procedure may be introduced by sending control messages from an SC to SSs.

In one embodiment, as an SS continuously moves through the network, the SS monitors internal RSSI, SNR, PER statistics continuously. In one embodiment, the WMPHDA-NTA protocol uses these statistics to execute one or more AMC (adaptive modulation and coding) algorithms and chooses the MCS for communication at the time. In one embodiment, MCS selection is controlled by Upper MAC layer of the SC for all active links.

In one embodiment, the MCS is essentially in itself LQI (link quality indicator) since in a comprehensive way the choice of MCS incorporates all relevant stats of the communication link.

While the above discussion concerns highly directive antennas, it is important to note that even in the case when an omnidirectional antenna is used on the SS, the WMPHDA-NTA protocol still offers significant advantages related to handover performance. The ability to execute handover to best candidate SC will not require antenna position vector calculation since the omnidirectional antenna is used but RF visibility and distance are still calculated from NTA data.

Frame Structure

In one embodiment, the WMPHDA-NTA protocol uses time division duplexing (TDD) to switch between UL and DL, and time division multiplexing (TDM) to switch between slaves. A TDD cycle starting with DL transmission from master and ending with UL transmissions from slaves is called a frame.

In one embodiment, the frames in the WMPHDA-NTA protocol are fixed duration, also known as non-adaptive mode. In another embodiment, the frames are variable duration, also known as adaptive mode. The non-adaptive mode is useful for multi-sector and multi base-station deployments in which it is very desirable to have all sectors synchronized, that is, all transmit at the same time and all receive at the same time. However the adaptive mode is more efficient in terms of delay and bandwidth usage.

Figure 5:
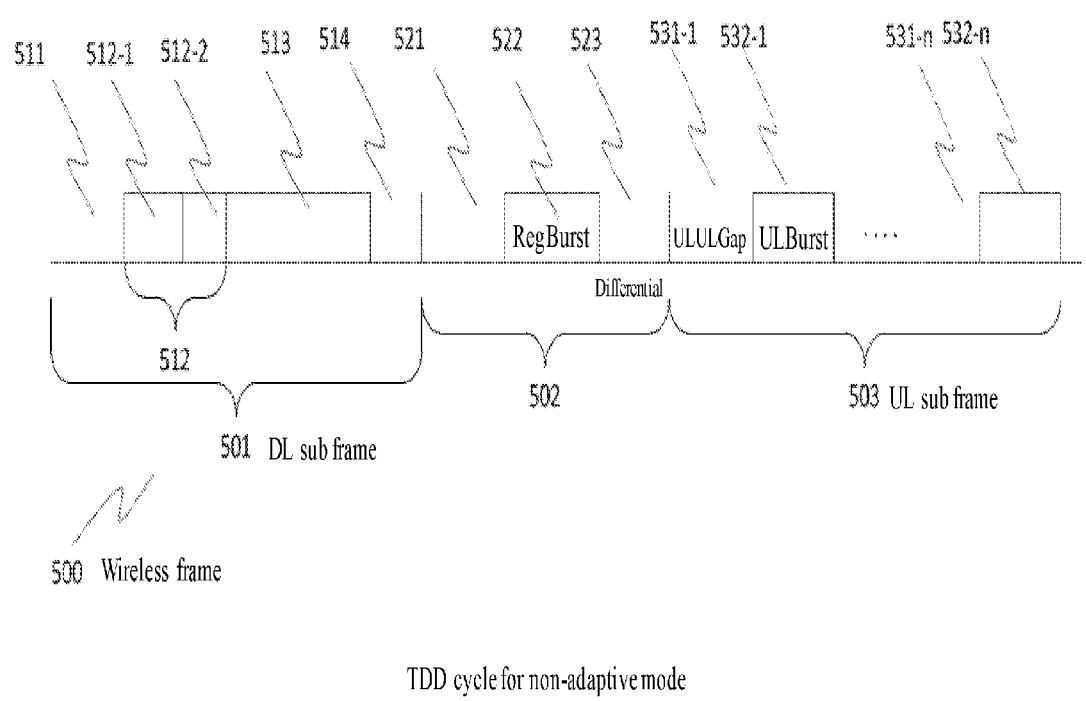
FIG. 5 shows one embodiment of a WMPHDA-NTA wireless frame.

In one embodiment, the typical structure of a TDD cycle for non-adaptive mode is shown in FIG. 5. As shown in FIG. 5, in one embodiment, if any slave attempts to register, the wireless frame 500 is composed of three major parts: downlink (DL) sub frame 501, registration sub frame 502 and uplink (UL) sub frame 503. In another embodiment, if no slave attempts to register, then the wireless frame 500 is comprised of DL sub frame 501 and UL sub frame 503. In a further embodiment, the SC continuously transmits at least the DLMgmt 302 portion of the wireless frame containing system preamble and frame MAP structure. If the SC is configured to operate as roaming/mobile SC there is a bit in the header of the MAP structure indicating that the SC is roaming/mobile.

FIG. 5 shows one embodiment of a more detailed breakdown of frame 200. In one embodiment, DL subframe 501 is comprised of uplink-downlink guardband ULDLGap 501-1, DLMgmt 501-2, DLBurst 501-3 and DLULGap 501-4. ULDLGap 501-1 is a time guard band inserted after the end of the preceding UL subframe and before the DL subframe 501. In one embodiment, DLMgmt 501-2 is comprised of a system preamble 501-2-1 and frame MAP 501-2-2. Frame MAP 501-2-2 describes the structure of all DL bursts and UL bursts. In one embodiment, DLBurst 501-3 is a downlink burst having NsymDL symbols divided into a number of data blocks carrying payload and DL control channel information messages. As previously explained, DLBurst 501-3 is used to communicate internal radio status and statistics information. Downlink-uplink guardband DLULGap 501-4 is a time guard band inserted after the end of the DLMgmt and DLBurst and before the UL subframe.

Registration subframe 502 is comprised of round trip delay (RTD) 521, RegBurst 522 and differential 523. The RTD 521 is the actual round trip delay for the SS attempting to register. As explained previously, RegBurst 522 is a registration burst corresponding to an SS. In one embodiment, as explained previously each RegBurst comprises a registration request S1 message from that SS. In case more than one station attempts to register, the registration subframe 502 will contain more than one RegBursts. In one embodiment, RegBurst 522 is comprised of NsymReg symbols. If no SSs are attempting to register, there are no RegBursts. Differential 523 is given by the maximum RTD for all the SSs less the RTD for the slave attempting to register.

UL subframe 503 is comprised of one or more pairs of uplink-uplink guardbands (ULULGap) and uplink burst (ULBurst). Referring to FIG. 5, ULULGap 531-$k$ and ULBurst 532-$k$ corresponding to the kth SS. ULULGap is a time guard band before the start of the transmission of the corresponding ULBurst. ULULGap is used to stop transmissions from an SS overlapping with transmissions from the adjacent SS. For example, in the case of n SSs as shown in FIG. 5, ULULGap 531-1 and ULBurst 532-1 correspond to SS 1; and ULULGap 531-$n$ and ULBurst 532-$n$ correspond to SS n. In one embodiment, the SC determines the start time of each ULBurst and the size of the ULULGap. In a further embodiment, the SC advertises the ULULGap within the frame MAP 501-2-2.

As explained previously, this arrangement can also be used to perform automatic ranging. In one embodiment, the initial registration slot in the UL portion is used for the initial ranging calculation of the user transmission. In one embodiment, the size of registration slot is at least equal to the sum of the interval corresponding to twice the distance of the SC cell size and the time length of SS registration request message itself.

Upon reception of the initial registration request message the SC measures position of the SS by comparing time at which the message is received with respect to the beginning of the initial registration slot. In one embodiment, this measurement is used to send a timing adjustment command back to SS as a part of a registration response message. The SS uses this value to adjust its UL transmission, so that the UL transmission arrives within the SC timing slot. The adjustment could either be to advance or delay the start of a transmission by the SC.

For mobile SSes, the distance to SC will change and hence there is a need to continuously adjust. In one embodiment, for every SS, the SC continuously measures the difference between the actual start time of a ULBurst transmission and the planned start time and continually sends timing advance or delay commands to the SS. Using this arrangement avoids the need for a special periodic ranging slot. In addition, this arrangement allows for fast and reliable timing control by providing fast feedback information.

Example Application: Ship Fleet

The WMPHDA-NTA protocol also supports roaming/mobile SC mode of operation. This is a unique feature of the WMPHDA-NTA protocol that enables a new set of applications. An example of an application that would benefit is a fleet of ships. In such a situation, there is a need to establish a communication network between the command ship and one or more of the other vessels. Then the command ship plays the role of the SC such as SC 121 of FIG. 1 and the one or more other vessels are SSes.

In one embodiment, the SC on the command ship continuously advertises NTA data according to its own movement. In one embodiment, a geo-fencing trigger is set on the SC and whenever command ship moves by more than a set distance, a new DL Control Channel broadcast message with updated NTA data shall be sent from the SC to all SS. This enables the SS to continuously maintain links with the command ship in a very much the same way as in the case of fixed SC.

As with explained before, vessel heading information can be obtained using variety of sensor technologies. In one embodiment, a GPS RTK internal heading solution is used. In this solution, a dual GPS receiver module with two antennas installed at a minimum distance of 1.5 m apart continuously resolves 3D GPS position and heading.

In one embodiment, multiple fleets are linked using separate WMPHDA-NTA links in order to continuously update NTA data for a global fleet.

Further Applications

One of skill in the art would be aware that the embodiments described above can be used in a variety of applications. In one embodiment, the protocol is optimized for use in small point to multipoint applications like small cell backhaul applications where rapid antenna steering (RAS) product implementations are used to steer antenna beam on SC per SS link in order.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method performed by a subscriber station for selecting one of a plurality of sector controllers in a wireless communications network, the method comprising:
   receiving a network topology data set from one of the plurality of sector controllers, the network topology data set comprising network settings corresponding to the plurality of sector controllers;
   based on the settings, selecting one of the plurality of sector controllers; and
   utilizing the settings to communicate with the selected one of the plurality of sector controllers;
   wherein selecting one of the plurality of sector controllers further comprises utilizing GPS data associated with the subscriber station.

2. The method of claim 1 wherein the subscriber station periodically receives an updated plurality of network topology set.

3. The method of claim 2 wherein the subscribe station requests the periodically received updated of the network topology set.

4. The method of claim 3 wherein the subscriber station requests the periodically received updated of the network topology set when crossing a geo-fence.

5. The method of claim 3 wherein the subscribe station requests the periodically received updated of the network topology set when moving more than a predetermined distance from its initial position.

6. The method of claim 2 wherein the subscriber station periodically receives the updated network topology set pushed from a second one of the plurality of sector controllers.

7. The method of claim 1 wherein selecting one the plurality of sector controllers comprises utilizing the plurality of network topology sets to attempt to evaluate communications with each of the plurality of sector controllers based on a positioning, acquiring and tracking algorithm.

8. The method of claim 7 wherein the positioning, acquiring and tracking algorithm is executed continuously.

9. The method of claim 1 wherein selecting one the plurality of sector controllers comprises utilizing the plurality of network topology sets is based on an antenna type of the subscriber station.

10. A method performed by a sector controller for distributing network topology data in a wireless communications network, the method comprising:
   preconfiguring the sector controller with a network topology data sets, ea the network topology data set comprising network settings corresponding to the sector controller and a plurality of other sector controllers;
   in response to receiving a registration request from a subscriber station, determining that the subscriber station is not at a fixed location and transmitting the network topology data sets to the subscriber station;
   based on the settings, the subscriber station selecting one of the plurality of sector controllers; and
   utilizing the settings to establish an operating link with the subscriber station;

wherein selecting one of the plurality of sector controllers further comprises utilizing GPS data associated with the subscriber station.

11. The method of claim 10 wherein the sector controller periodically receives an updated network topology set.

12. The method of claim 11 wherein in response to an update response from the subscriber station, the sector controller transmits the updated network topology set to the subscriber station.

13. The method of claim 11 wherein the sector controller periodically pushes the updated network topology set to the subscriber station.

14. The method of claim 10 further comprising the sector controller detecting an oversubscription ratio being exceeded and instructing the sector controller to initiate a handover procedure to an alternate sector controller.

15. The method of claim 10 further comprising the sector controller detecting a loading factor being exceeded and instructing the sector controller to initiate a handover procedure to an alternate sector controller.

* * * * *